(12) United States Patent
Mitchell et al.

(10) Patent No.: US 7,343,693 B2
(45) Date of Patent: Mar. 18, 2008

(54) SCALE ASSEMBLY FOR OPTICAL ENCODER HAVING AFFIXED OPTICAL REFERENCE MARKERS

(75) Inventors: Donald K. Mitchell, Wayland, MA (US); Donald L. Grimes, Milford, MA (US); William G. Thorburn, Whitinsville, MA (US); Stuart A. Dodson, II, Waltham, MA (US); Keith M. Hinrichs, Natick, MA (US); Andrew Goldman, Stow, MA (US); Joel M. Petersen, Valley Village, CA (US); Christopher C. Rich, Rancho Palos Verdes, CA (US)

(73) Assignee: GSI Group Corporation, Billerica, MA (US)

( * ) Notice: Subject to any disclaimer, the term of this patent is extended or adjusted under 35 U.S.C. 154(b) by 0 days.

(21) Appl. No.: 11/598,257

(22) Filed: Nov. 9, 2006

(65) Prior Publication Data

US 2007/0144026 A1 Jun. 28, 2007

Related U.S. Application Data

(60) Provisional application No. 60/734,999, filed on Nov. 9, 2005.

(51) Int. Cl.
*G01B 11/02* (2006.01)
(52) U.S. Cl. .................................................. 33/707
(58) Field of Classification Search ............ 33/707, 33/706, 710, 758
See application file for complete search history.

(56) References Cited

U.S. PATENT DOCUMENTS

| | | | | |
|---|---|---|---|---|
| 2,742,705 A | * | 4/1956 | Gelardi | 33/758 |
| 4,367,590 A | * | 1/1983 | Winter et al. | 33/758 |
| 4,982,509 A | * | 1/1991 | Luttmer et al. | 33/706 |
| 5,950,321 A | * | 9/1999 | Pena et al. | 33/758 |
| 6,067,722 A | * | 5/2000 | Goodyer et al. | 33/758 |
| 6,532,681 B2 | * | 3/2003 | Tondorf | 33/707 |
| 6,865,820 B2 | * | 3/2005 | Burgschat et al. | 33/706 |
| 7,007,397 B2 | * | 3/2006 | Kodama et al. | 33/706 |
| 7,188,433 B2 | * | 3/2007 | Boge et al. | 33/706 |
| 7,231,858 B2 | * | 6/2007 | Oberheim | 33/706 |
| 2003/0200671 A1 | * | 10/2003 | Muller | 33/706 |
| 2004/0211078 A1 | * | 10/2004 | Kodama et al. | 33/706 |

* cited by examiner

*Primary Examiner*—Christopher W Fulton
(74) *Attorney, Agent, or Firm*—BainwoodHuang

(57) ABSTRACT

A flexible optical marker is applied to an optical scale substrate to make an optical scale assembly for an optical position encoder. The marker may be a limit marker, index marker, or other type of marker. The marker substrate may be a plastic film such as polyester, singulated from a "recombine" roll created by a web process. The marker has a microstructured pattern on one surface that is covered with a reflective metal coating. The marker also has an adhesive layer and is affixed to the optical scale substrate by a process of aligning the marker to an edge of the scale and then applying pressure to the upper surface of the marker. The marker may be applied with a handle portion that is separated from the marker after the marker is affixed. The marker may be especially useful with a flexible scale substrate such as a metal tape substrate. By affixing the marker to the scale substrate as a separate step of making an encoder scale, various benefits such as reduced inventory, cost, and lead time may be achieved.

15 Claims, 5 Drawing Sheets

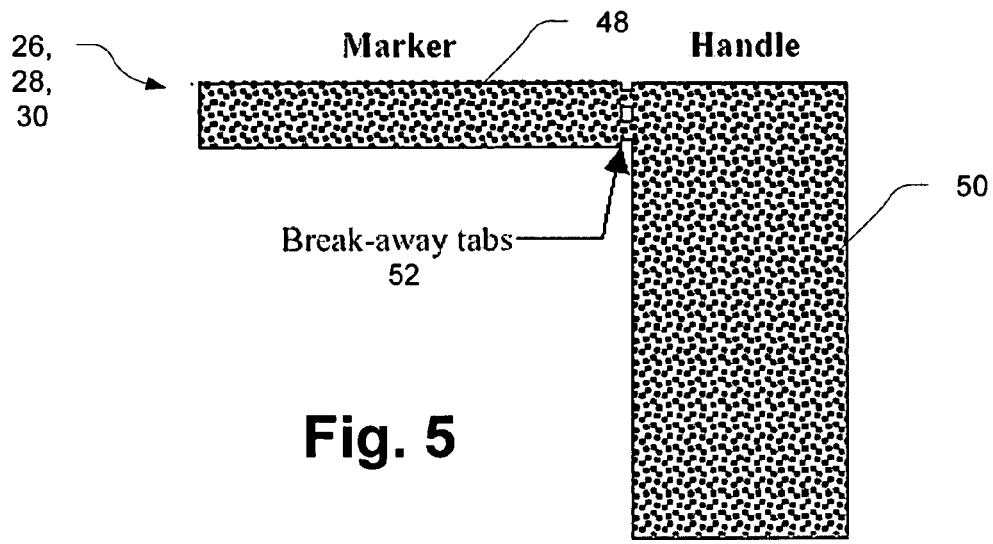
Fig. 5
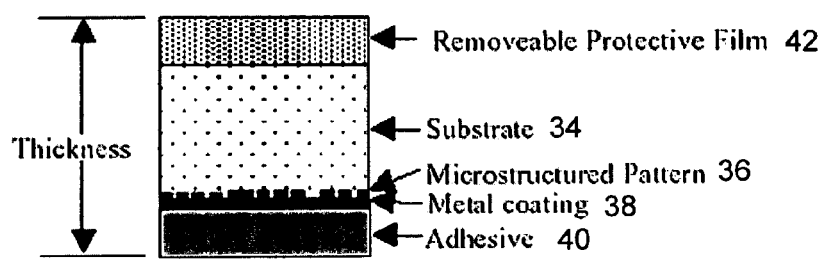
Fig. 6
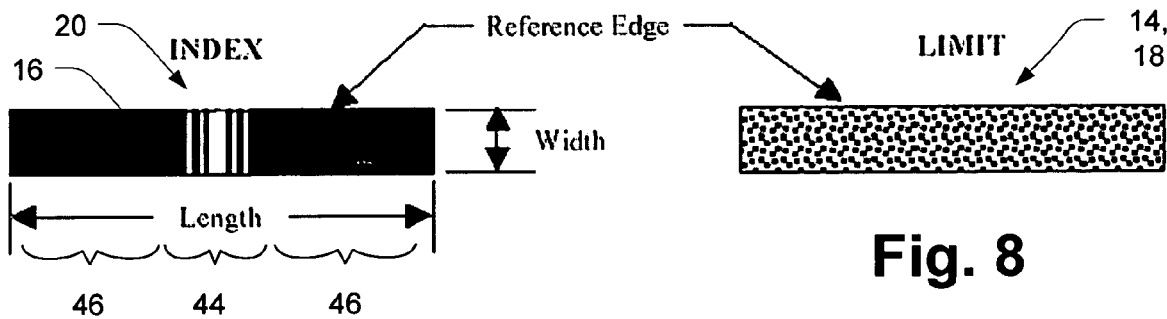
Fig. 7
Fig. 8

SCALE ASSEMBLY FOR OPTICAL ENCODER HAVING AFFIXED OPTICAL REFERENCE MARKERS

CROSS REFERENCE TO RELATED APPLICATIONS

This application claims the benefit under 35 U.S.C. § 119(e) of U.S. Provisional Application No. 60/734,999 filed Nov. 9, 2005, the disclosure of which is hereby incorporated by reference herein.

BACKGROUND

In the field of optical position encoders, for example incremental optical position encoders, it is known to include markers on or with an optical scale that is used to derive fine-grained position information. The markers may include, for example, an index marker that establishes a "home" or index position of the encoder from which all position measurements or indications are referenced. So-called "limit" markers have also been used, especially in linear position encoders, to provide an indication when the encoder has reached a limit of its travel. Other types of markers have also been employed.

There are alternative techniques for incorporating a marker with an optical scale. In a typical approach, a marker is simply a special feature of the scale itself, and is formed at the same time and by the same process by which the regular scale features (e.g., regularly spaced lines) are formed. The marker may be a set of separate elements apart from the scale marks, or they may be specially formed scale marks, such as a set of relatively longer or shorter marks or some other modification of the basic mark structure. In all these cases, the marker is an integral part of the scale itself, and thus the scale as manufactured has a predetermined arrangement or marks. This makes such scales to some extent "custom"—they are designed with particular applications in mind that utilize certain specific arrangements of markers. If a scale vendor is to sell products to many customers having a variety of applications, it is necessary for the vendor to manufacture and stock a corresponding variety of scale types, which can contribute to increased cost for engineering, manufacturing, and customer support.

Alternatively, it has been known to manufacture scales with multiple markers formed at the same time as the scale at predetermined locations, and then for a customer/user to choose which of the markers matches his/her application and then selectively remove those that are not needed. The unused markers are either physically covered or removed. It is noted that this method is not fully-customizable, as a customer's choices for marker position are limited to those predetermined locations selected by the scale manufacturer.

It is also known to create a scale assembly by incorporating separate markers onto scales that are unmarked as manufactured (i.e., scales that have no markers apart from the regularly spaced scale marks). For example, in one arrangement a magnetic element is placed immediately adjacent to an edge of a linear scale of a linear optical encoder. The element can be detected by a magnetic detector that is co-located with the optical detector that reads the regular optical scale marks. Other approaches using markers entirely separate from the optical scale are also known.

SUMMARY

There are benefits to adding markers as a customization to an optical scale rather than incorporating them into the design and manufacture of the scale itself. The scale can be manufactured in larger volumes, because its non-customized nature enables its use in a variety of applications. The customization occurs as a separate step of adding the markers as dictated by the application. The benefits can include reduced cost and greater flexibility in the application of optical encoder technology. However, known techniques for adding separate markers may have significant drawbacks. For example, the above-mentioned technique of utilizing a separate magnetic element requires a generally more complex encoder design, as it must incorporate different sensing technologies (optical and magnetic). Also, magnetic position sensing generally has much lower precision than optical position sensing, and thus the use of a magnetic marker may compromise the performance of the overall position encoder.

In accordance with the present invention, an optical marker is disclosed that can be added as a customization to a scale of an optical encoder, along with techniques for manufacturing the optical marker and customized scale assembly. The marker may include a flexible substrate material such as plastic for relatively low cost and relatively easy application. The marker may be used in a variety of applications including with a flexible scale substrate such as an elongated metal tape.

A disclosed method of making a scale assembly for an optical encoder includes the step of obtaining a pre-made optical scale substrate which has a pattern of optical scale marks that are operative, in conjunction with a light source in the encoder, to produce an optical intensity distribution to be sensed by detector circuitry in the optical encoder. The pattern of scale marks may be a set of equally spaced linear marks extending crosswise on the scale substrate for example, although other types of patterns may be used. Additionally, a pre-made optical marker is obtained, which has a substrate on which a marker pattern is formed that works in conjunction with the encoder light source to produce an optical intensity distribution that is sensed by the detector circuitry. The marker substrate may be a flexible material such as polyester or polycarbonate. A rigid material such as glass or reflective metal may be used as a marker substrate in alternative embodiments. The flexible optical marker may have advantages over rigid markers including lower cost, ease of application, and wider potential use due to its ability to conform to non-planar surfaces.

The pre-made optical marker is applied to the pre-made optical scale at a predetermined location as determined by the application of the encoder. The marker is placed such that the resulting optical intensity distribution is detectable by the detector circuitry of the encoder as an indicator of a predefined relative position between the scale and the detector. Examples of such markers and positions include limit markers that may be placed at the left and right limits of travel of a linear scale, and an index marker placed at a predetermined location that is defined as the reference point for all displacement indications from the encoder, such as at the center of a linear scale.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 5 is a plan view of an intermediate workpiece consisting of a reference marker and a handle portion as taken from the recombine of FIG. 4 during production of the scale assembly of FIG. 3;

FIG. 6 is a section view illustrating the layers of the recombine of FIG. 4;

FIG. 7 is a plan view of one of the reference markers of FIG. 3 serving as an index marker;

FIG. 8 is a plan view of another of the reference markers of FIG. 3 serving as a limit marker;

DETAILED DESCRIPTION

Figure 1:
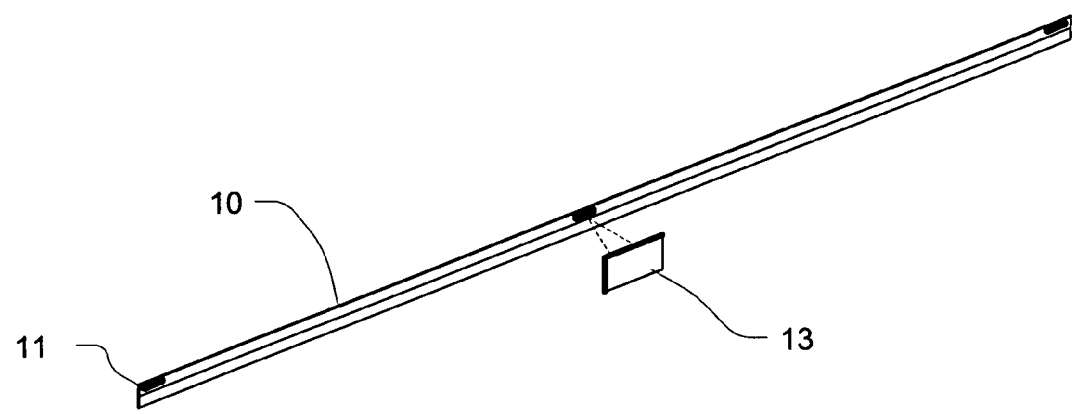
FIG. 1 is a simplified diagram of a linear optical position encoder including a scale assembly in accordance with the present invention.

FIG. 1 shows a linear optical position encoder, which consists of a scale assembly 10 and a source/detector assembly 13. Linear optical encoders are used in applications in which it is necessary to know the precise relative position between two items that experience relative linear motion. The scale assembly 10 is mounted or secured to one of the items, and the source/detector assembly 13 to the other. As an example, the scale assembly 10 may be mounted to a relatively stationary frame along which a tool or other object travels in a manufacturing or assembly process. The source/detector assembly 13 is mounted to the tool or other object. As generally known in the art, the scale assembly 10 includes a scale pattern such as a series of relatively finely spaced marks extending crosswise, i.e., perpendicular to one of the long edges of the scale assembly 10. In operation, the scale pattern is irradiated with light from a light source such as a laser diode in the source/detector assembly 13, and the pattern of light reflected or transmitted by the scale pattern is detected by optical detector circuitry within the source/detector assembly 13. As the scale assembly 10 moves lengthwise with respect to the light source and detector, the pattern of light incident on the detector changes correspondingly. The detector circuitry responds to the changing pattern to provide an indication of the relative motion between the scale assembly 10 and the source/detector assembly 13. Also shown in FIG. 1 are markers referred to generally at 11; these are described in more detail below.

Figure 2:
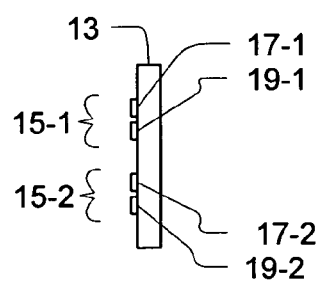
FIG. 2 is a simplified side view of an encoder read head in the optical position encoder of FIG. 1.

FIG. 2 shows a simplified side view of the source/detector assembly 13. In the illustrated embodiment, it includes two separate sets 15-1 and 15-2 of source/detector circuits, each set including a respective light source 17 (17-1, 17-2) and detector 19 (19-1, 19-2, also collectively referred to as "detector circuitry"). For each set 15, the respective source 17 illuminates a corresponding part of the scale assembly 10, and the reflected light pattern is detected by the detector 19 of the same set 15. In the illustrated embodiment, one set 15 (e.g., 15-2) operates in conjunction with a scale pattern on the scale assembly 10 to detect incremental relative motion with high precision. The other set 15 (e.g., 15-1) detects reference markers that are used to indicate limits of travel and to establish a reference or index for absolute position indication, as described in more detail below.

Figure 3:
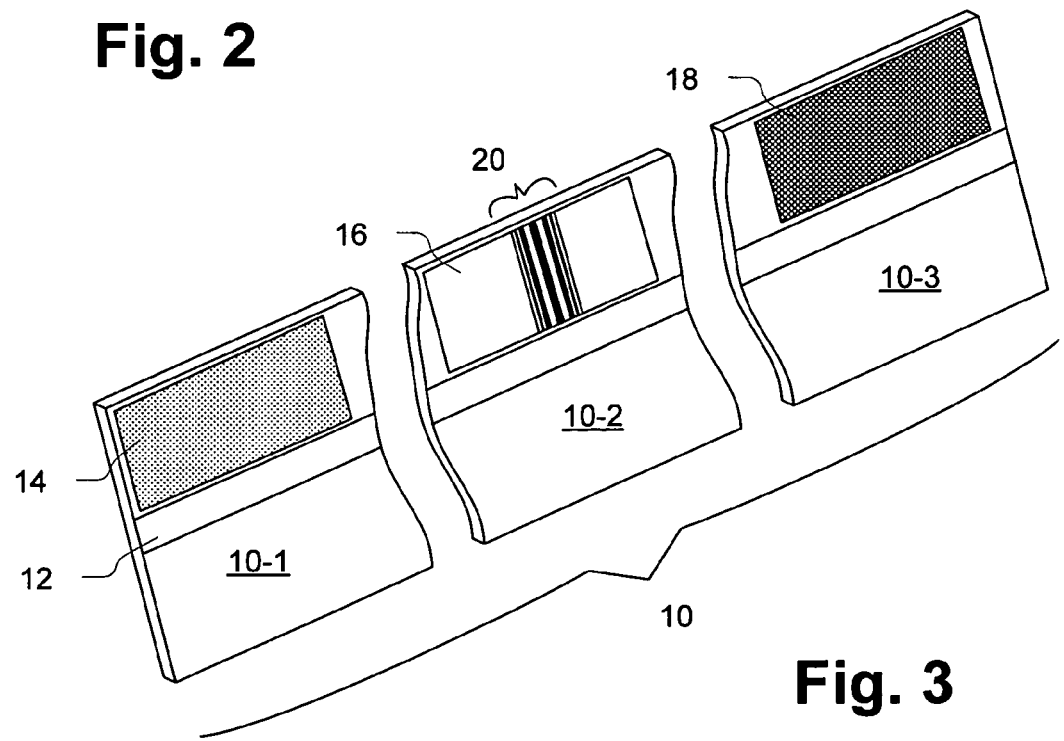
FIG. 3 is a diagram of the scale assembly of FIG. 1 showing affixed optical reference markers in accordance with the present invention.

FIG. 3 shows a segmented view of the scale assembly 10. A left end portion 10-1, center portion 10-2 and right-end portion 10-3 are shown. In the illustrated embodiment, the scale assembly 10 has a substrate of a strong, flexible material, including for example a nickel alloy material such as known by the trade names Inconel® and Invar®. The scale assembly 10 has a scale pattern 12, such as a diffraction grating, formed along its length.

The scale assembly 10 also includes three reference markers, including a left limit marker 14, an index marker 16, and a right limit marker 18. The left and right limit markers 14, 18 provide respective areas of different reflectivity from the background reflectivity of the scale substrate. In the illustrated embodiment, the limit markers 14 and 18 operate by diffusely reflecting an incident light beam into a reflected cone of light. A particular optical power at the detector is achieved by selecting a corresponding particular cone angle, as described in more detail below. The index marker 16 has an index pattern 20, formed as binary phase pattern, that acts as a cylindrical lens, focusing an incident light beam into a line intensity pattern at a corresponding index optical detector. The relative position at which the line intensity pattern is incident upon the index optical detector is denoted the "index position" of an incremental optical encoder. All other relative positions are identified as incrementally measured displacements from the index position.

It is noted that in the present description the terms "scale" may be used to refer to the underlying substrate with the scale pattern 12 formed thereon, prior to affixation of the markers 14, 16 and 18. In the case of a flexible scale substrate, the term "tape" or "tape scale" may alternatively be employed. When the markers are affixed, such as shown in FIG. 3, the term "scale assembly" is used.

Figure 4:
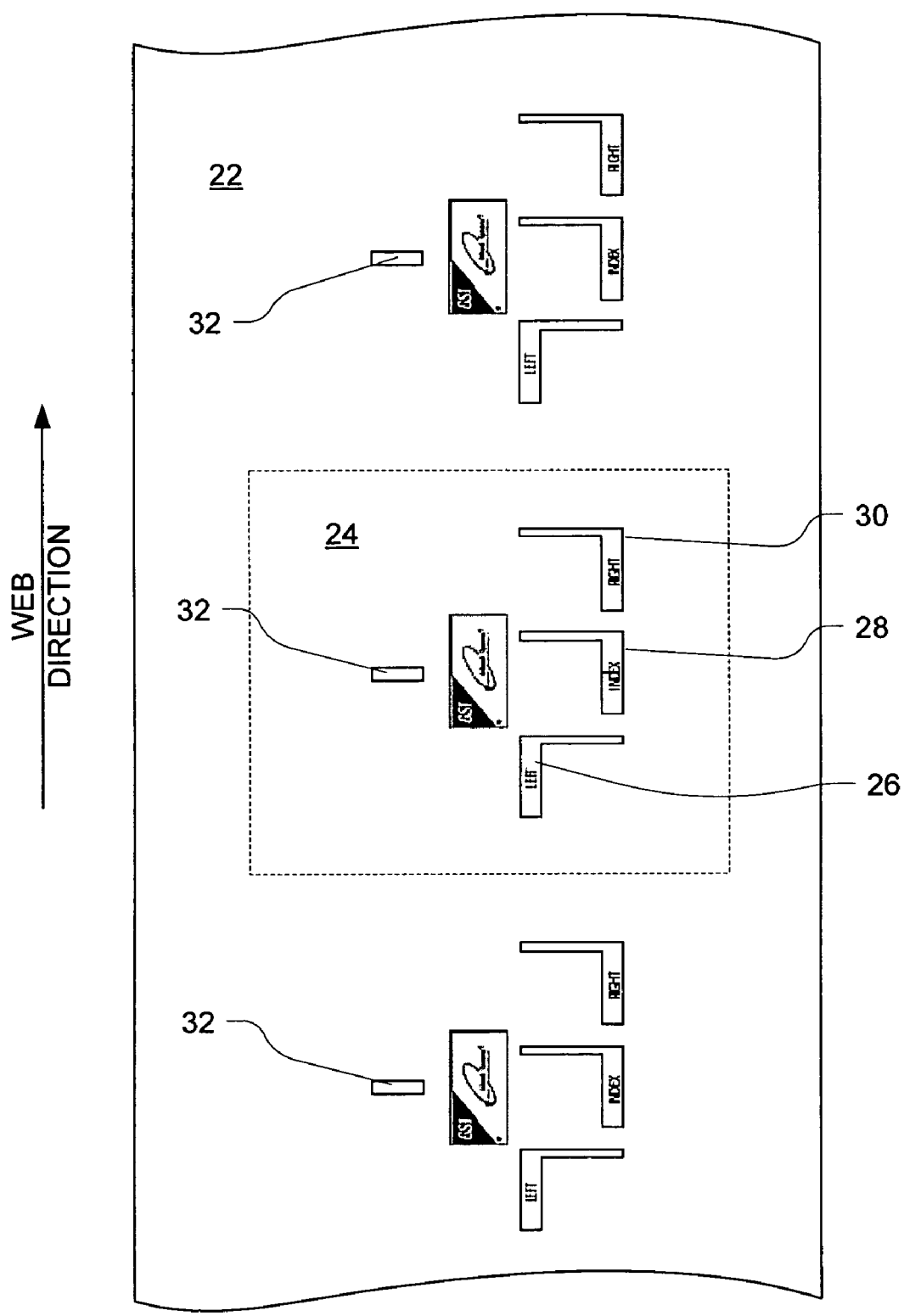
FIG. 4 is a plan view of a section of a roll of layered "recombine" from which the optical reference markers are taken during production of the scale assembly of FIG. 3.

FIG. 4 shows a section of an article referred to as a "recombine" 22, which is a multi-layered, elongated sheet from which individual workpieces including the markers 14, 16 and 18 of FIG. 3 can be separated or "singulated". The layer structure of the recombine 22 is shown below. The recombine 22 is typically manufactured into a roll in a web process. The recombine 22 has repeated sets 24 of various elements that are utilized in assembling the scale assembly 10. A roll can be utilized in a process of assembling a number of scales 10 in a batch fashion. Alternatively, sections having one or more sets 24 can be separated from the roll and provided to customers as part of a kit from which the customer assembles one or more custom optical encoder scales. The customer can use the items from each set 24 to affix the markers 14, 16 and 18 to the customer's scale, as described in more detail below.

In particular, each set 24 includes a left limit marker workpiece 26, an index marker workpiece 28, and a right limit marker workpiece 30. The workpieces 26, 28 and 30 correspond to different areas of the recombine 22, specifically different microstructured patterns as described below. They also become physically separated from surrounding areas of the recombine 22 by die cutting as part of the web process. A set of regularly spaced registration fiducials 32 serve to facilitate aligning the die cutting apparatus with the recombine for accurate cutting.

FIG. 5 shows the shape and structure of the workpieces 26, 28 and 30 of FIG. 4. Each workpiece includes a marker portion 48 and a handle portion 50. The marker portion 48 eventually becomes the respective marker 14, 16 or 18. The marker portion 48 and handle portion 50 are separated by an area of perforation or one or more break-away tabs 52 to facilitate separating the handle portion 50 during assembly as described below.

FIG. 6 illustrates the layered construction of the recombine 22. It includes a substrate 34 of an optically clear plastic material such as polyester or polycarbonate, one surface (bottom) of which has been patterned with an optical surface relief or "microstructured" pattern 36. A reflective metal coating 38 is deposited on the patterned surface of the substrate 34, and a pressure-sensitive adhesive 40 is disposed on the metal coating 38. Not shown is a removable backing that covers the adhesive layer 40 and is removed from each individual marker prior to being affixed to the scale. On the other (top) surface of the substrate 34 is a protective film 42 to protect against contamination during manufacture of the recombine 22 and assembly of the scale assembly 10. It is preferred that the protective film 42 have some degree of opacity, color, or other characteristic to enable an assembler to easily discern its presence so as to remove it at the appropriate assembly step. A typical thickness for the recombine 22 may be approximately 0.40 mm.

In the illustrated embodiment, the pattern 36 and metallization 38 are oriented on the bottom of the substrate 34 so that the polyester substrate material can act as a protective layer during operation. In this manner, both the pattern 36 and the reflectivity of metallization 38 should be more robust and less susceptible to damage. In alternative embodiments, it may be beneficial to locate the pattern 36 and metallization on the top surface of substrate 34.

The microstructured pattern 36 includes individual pattern areas corresponding to the different workpieces 26, 28 and 30, which are formed by UV-photopolymer casting or embossing against a die disposed on a cylindrical roller over which the substrate 34 passes in the web process. The pattern areas for the left and right limit markers 14 and 18 are so-called "tailored microdiffuser" (TMD™) patterns that provide the above-described cone-shaped light reflection pattern, although other diffusing surfaces may be used. The left limit marker 14 may have a cone angle of approximately 8 degrees in order to provide the desired 50% optical power at the detector, and the right limit marker 18 may have a cone angle of approximately 80 degrees in order to provide the desired 10% optical power at the detector. These patterns fill the entire bottom surface of the respective limit marker 14 and 18. The pattern area for the index marker 16 has an index pattern that is described in more detail below. It will be appreciated that the microstructured pattern 36 may be metallized to create a correspondingly patterned reflective metal surface. Alternatively, the pattern may be left non-metallized for use in a transmissive optical encoder system, with the detector disposed on the opposite side of the scale from the light source.

FIG. 7 shows the index marker 16 with index pattern 20. In the illustrated embodiment the index marker 16 has a rectangular shape elongated in the lengthwise direction of the scale assembly 10. The index pattern 20 occupies only the center area 44 of the index marker 16; the outer areas 46 simply reflect incident light as planar mirrors, and therefore are not active components in the operation of the encoder.

The outer areas 46 do serve a function during assembly, however, as described in more detail below. In one embodiment, a typical size for the index marker 16 is 20.0 mm by 2.0 mm.

FIG. 8 is a generalized view of the limit markers 14, 18. In the illustrated embodiment, these are of generally the same shape and size as the index marker 16. A pattern of dots represents the tailored microdiffuser pattern 36 of these markers 14, 18.

One long edge of both the index marker 16 and the limit markers 14, 18 is termed a "reference edge" as shown. During a process of affixing the marker 14, 16, 18 to the scale, the reference edge is placed against a corresponding edge of an assembly tool so as to be aligned with a corresponding edge of the scale. This process is described below.

Figure 9:
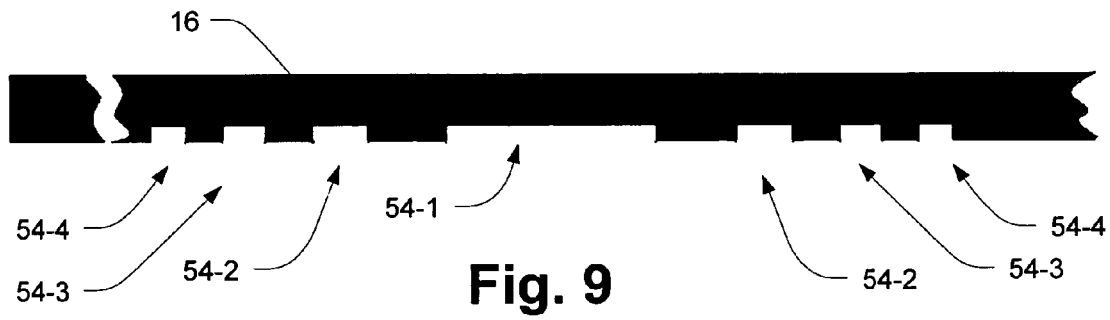
FIG. 9 is a schematic side view of an index pattern on the index marker of FIG. 6.

FIG. 9 shows the detailed profile of the microstructured pattern 36 for the index marker 16 in particular. The pattern consists of a set of grooves or depressions 54 having a rectangular cross-section. A central depression 54-1 is the widest, and successively outer depressions 54-2 through 54-4 are successively narrower. The specific dimensions (depth, width and separation) are chosen in conjunction with other parameters of the optical encoder (such as the spacing between the scale and the source/detector, the wavelength of the light emitted by the light source, the refractive index of the marker substrate, etc.) to yield the desired behavior of a cylindrical Fresnel zone lens as previously described. Techniques for arriving at a specific set of dimensions are generally known in the art.

Figure 10:
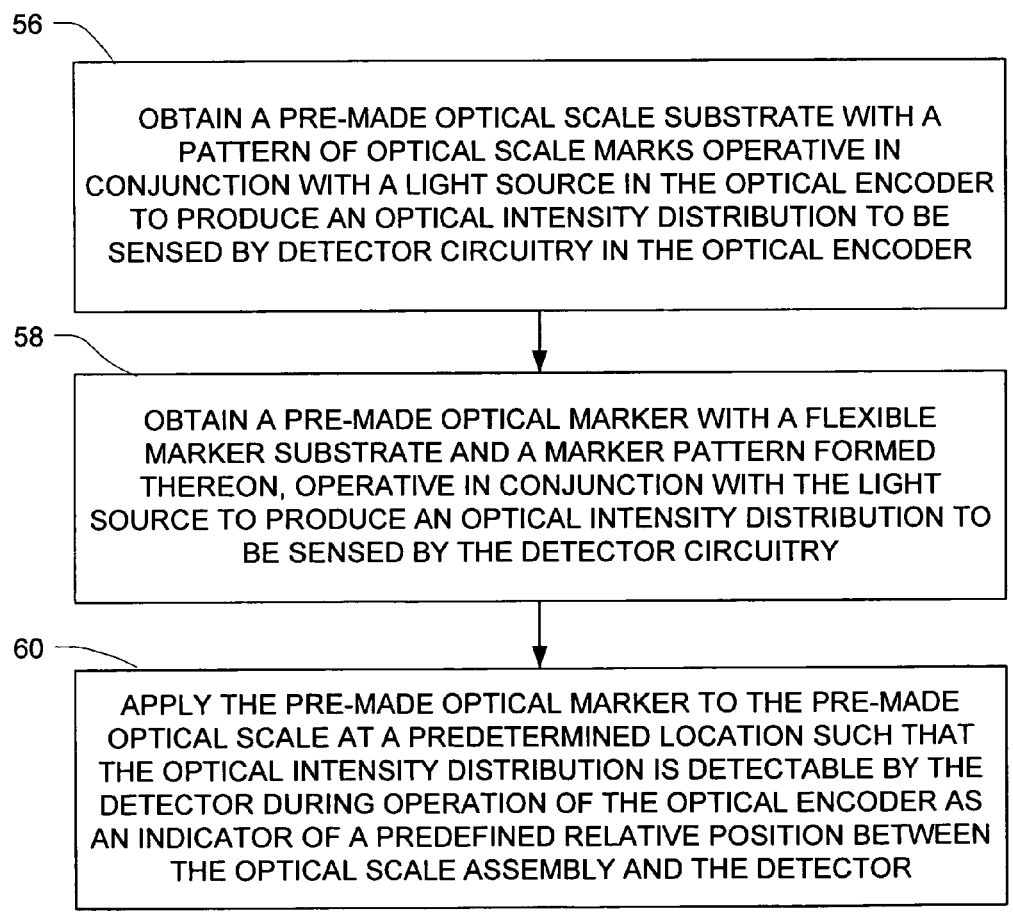
FIG. 10 is a flow diagram of a process of producing the scale assembly of FIG. 3.

FIG. 10 shows a process by which the scale assembly 10 is produced. In step 56, a pre-made optical scale substrate is obtained which has a pattern of optical scale marks that are operative, in conjunction with the light source in the encoder, to produce an optical intensity distribution to be sensed by detector circuitry in the optical encoder. As mentioned above, the pattern of scale marks is typically a set of equally spaced linear marks extending crosswise on the scale substrate, although other types of patterns may be used.

In step 58, a pre-made optical marker is obtained, which has a substrate on which a marker pattern is formed that works in conjunction with the encoder light source to produce an optical intensity distribution that is sensed by the detector circuitry. As described above with reference to FIG. 2, the detector circuitry typically includes separate optical detectors (e.g. 19-1 and 19-2) for the scale optical intensity distribution and the marker optical intensity distribution. Separate light sources (e.g. 17-1 and 17-2) may also be employed. The marker substrate may be a flexible material such as the above-described polyester substrate 34 used for the markers 14, 16 and 18. A rigid material such as glass or reflective metal may be used as a marker substrate in alternative embodiments. The flexible optical marker has several advantages over rigid markers including lower cost, ease of application, and wider potential use. A flexible marker can readily conform to a non-planar scale. In particular, a flexible marker may be especially useful with a flexible scale such as the tape scale described above. If an application calls for a flexible scale to accommodate some non-planarity of the underlying item to which the scale is to be applied, then such an application may benefit from a flexible marker as well. As an example, a linear encoder can be used to measure rotation of a cylindrical object by wrapping a flexible linear scale around the object and placing the source/detector assembly opposite the scale in an orientation to detect a tangential motion. In such an encoder it may be beneficial to use a flexible index marker to conform to the cylindrical tape scale.

Referring again to FIG. 10, in step 60 the pre-made optical marker is applied to the pre-made optical scale at a predetermined location as determined by the application of the encoder. The marker is placed such that it is detectable by the detector circuitry of the encoder as an indicator of a predefined relative position between the scale and the detector. Examples are given above—i.e., limit markers 14 and 18 placed at the left and right limits of travel, and an index marker 16 placed at a location that is defined as the reference point for all displacement indications from the encoder, such as at the center of a linear scale.

Figure 11:
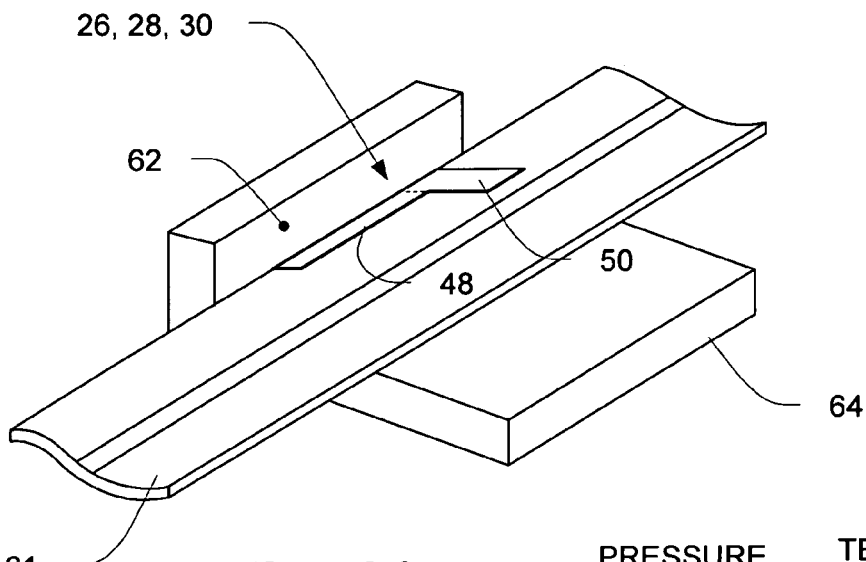
FIGS. 11-13 are diagrams illustrating a process of applying an individual marker in the scale production process of FIG. 10.
Figure 12:
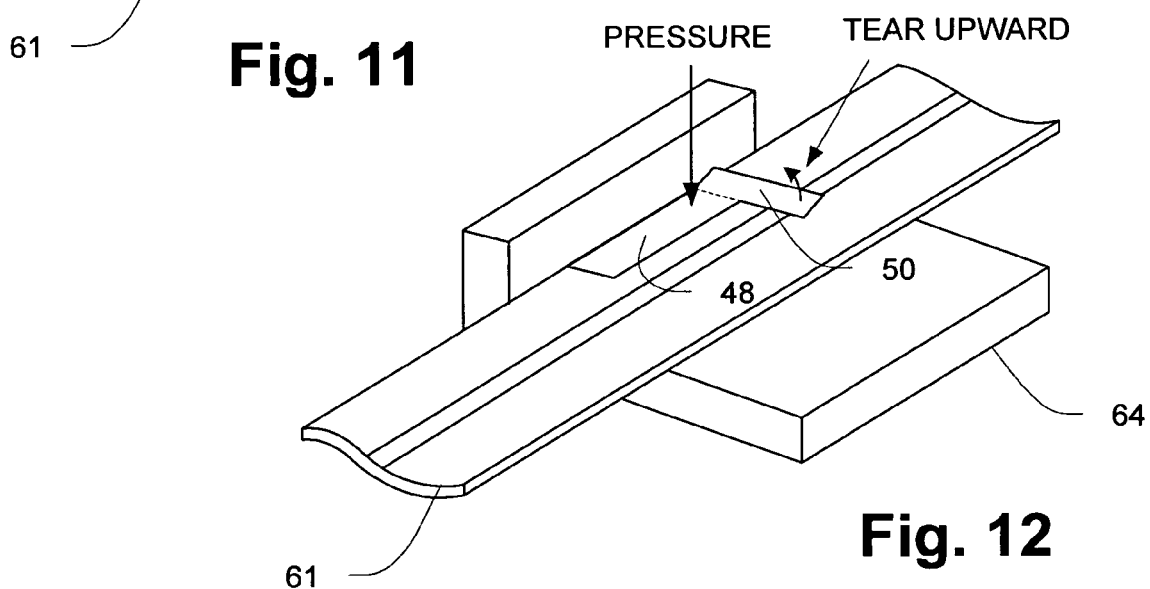
Figure 13:
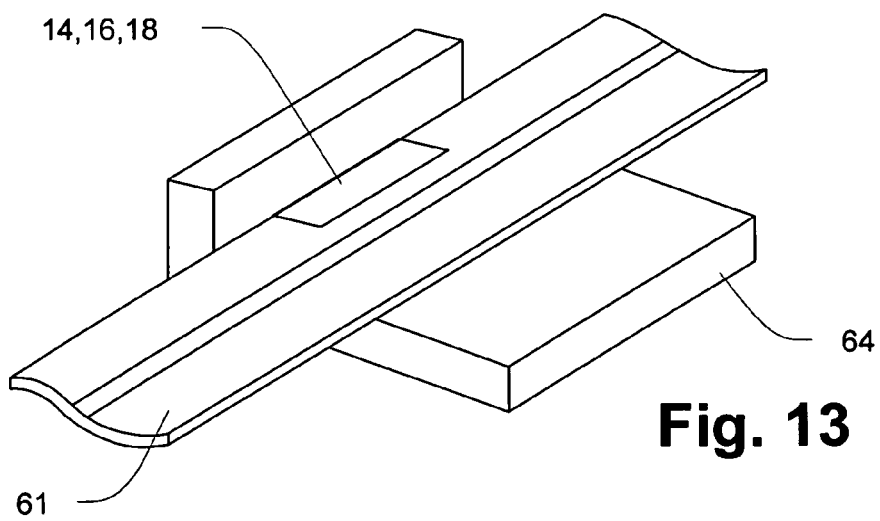

FIGS. 11-13 illustrate the process of FIG. 10 in conjunction with the specific markers 14, 16 and 18 and workpieces 26, 28, and 30 described above. In FIG. 11, a pre-made scale 61 is placed with its reference edge against a flat vertical surface 62 of a rigid, L-shaped tool referred to as a workbench 64. A workpiece 26, 28 or 30 with exposed adhesive layer 40 is placed at an angle such that its reference edge is butted against the surface 62 and rests against the reference edge of the scale 61. As shown in FIG. 12, the workpiece 26, 28 or 30 is then rotated downward such that the marker portion 48 lies flat on the scale 61, while the handle portion 50 is held slightly upwardly. At this point, pressure is applied to the marker portion 48 to hold it in place while the handle portion 50 is torn away (upwardly) along the perforations 52. The result is as shown in FIG. 13—the marker portion 48 is now adhered to the scale 61 at the desired location, with its reference edge aligned with the reference edge of the scale 61.

The above illustrates the use of the outer areas 46 of the index marker 16. A tool or an assembler's finger can be pressed against the outer area 46 to apply the hold-down pressure without having to touch the central area 44 in which the index pattern 20 is located, thus reducing the risk of contaminating or mechanically distorting the index pattern 20.

Although the above description is specific to a linear scale, it will be appreciated that the presently disclosed techniques may be used with rotary scales and rotary encoders as well. The scale substrate may be flexible or rigid as mentioned above.

Depending on the size of the marker and the tolerance of its position on the scale, it may be installed by hand or it may be preferable to utilize a tool for greater control and/or precision. A tool with a mechanical grasping action, similar to that of a pair of tweezers, may be desirable. It may be desirable to incorporate some kind of referencing feature on the tool to enhance the accuracy of the placement of the marker.

It may also be desirable to incorporate additional marks or patterns on the markers that may be used to ascertain the degree of alignment of the marker, especially that of an index marker for example. The alignment information can be used to track the quality of the assembly process and also perhaps to provide corrections in an operating system to compensate for a known amount of mis-alignment.

Although in the above description the microstructured pattern layer 36 is formed using UV-photopolymer casting or embossing in a roll process, in alternative embodiments the patterns may be formed on a marker substrate using alternative methods such as molding, etching, laser processing, or photolithographic processing for example. Either or both of phase and/or amplitude features can be utilized. The markers may also be formed from polarizing films with differing reflection or transmission properties. The use of an adhesive layer and/or protective film are optional and may be dispensed with in alternative embodiments, although clearly there still is a requirement for a separate adhesive to affix the marker to the scale. Also, an adhesive layer if used may be any of several types, including for example pressure sensitive adhesive, epoxy, or UV-curable adhesive.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A stick-on marker to be applied to a scale of an optical position encoder, comprising:
    a flexible planar substrate dimensioned and configured to be adhered to the scale at a predetermined location; and
    a marker pattern on the planar substrate, the marker pattern being operative in conjunction with a light source of the optical position encoder to produce an optical intensity distribution to be sensed by detector circuitry of the optical position encoder.

2. A stick-on marker according to claim 1 wherein the marker pattern is optically reflective.

3. A stick-on marker according to claim 2 wherein the reflective marker pattern comprises a patterned reflective metal coating.

4. A stick-on marker according to claim 3 wherein the substrate is optically transparent and the patterned reflective metal coating is disposed on a surface of the substrate away from the light source and detector circuitry of the optical position encoder.

5. A stick-on marker according to claim 4 wherein the surface of the substrate has a microstructured pattern and the patterned reflective metal coating has been deposited on the surface of the substrate so as to create a correspondingly patterned reflective metal surface which forms the reflective marker pattern.

6. A stick-on marker according to claim 5 wherein the marker pattern comprises a binary phase pattern.

7. A stick-on marker according to claim 1 wherein the marker pattern comprises a diffractive optic.

8. A stick-on marker according to claim 7 wherein the diffractive optic comprises a zone lens.

9. A stick-on marker according to claim 1 wherein the marker pattern is operative to diffusely reflect light from the light source such that the optical intensity distribution has a predetermined optical power at the detector indicating that the predetermined location of the scale has been encountered by the detector circuitry.

10. A stick-on marker according to claim 1 having a central area and an outer area, the central area being optically active to create the optical intensity distribution sensed by the detector circuitry, the outer area being optically inactive and dimensioned to be engaged by an installation tool during application of the stick-on maker to the scale while maintaining separation between the installation tool and the central area of the stick-on marker.

11. A scale assembly for an optical position encoder, comprising:
    a scale; and
    the stick-on marker of claim 1 applied to the scale at a predetermined location such that the marker pattern of the stick-on marker is operative in conjunction with a light source of the optical position encoder to produce an optical intensity distribution to be sensed by detector circuitry of the optical position encoder.

12. An optical position encoder, comprising:
a light source;
detector circuitry; and
the scale assembly of claim 11.

13. A method of making a scale assembly of an optical position encoder, comprising:
  obtaining a pre-made optical scale substrate with a plurality of relatively finely spaced scale marks operative in conjunction with a light source in the optical position encoder to produce an optical intensity distribution to be sensed by detector circuitry in the optical position encoder;
  obtaining a pre-made optical marker having a flexible marker substrate with a marker pattern formed thereon operative in conjunction with the light source to produce an optical intensity distribution to be sensed by the detector circuitry; and
  applying the pre-made optical marker to the pre-made optical scale substrate at a predetermined location such that the marker pattern is detectable by the detector during operation of the optical position encoder as an indicator of a predefined relative position between the optical scale and the detector.

14. A method according to claim 13 wherein the flexible marker substrate comprises part of a compound substrate including a handle portion attached to the flexible marker substrate, and wherein applying the pre-made optical marker to the pre-made optical scale substrate comprises using the handle portion to place the flexible marker substrate on the pre-made optical scale substrate and subsequently removing the handle portion.

15. A method according to claim 13 wherein the pre-made optical marker has a central area and an outer area, the central area being optically active to create the optical intensity distribution sensed by the detector circuitry, the outer area being optically inactive and dimensioned to be engaged by an installation tool, and wherein applying the pre-made optical marker to the pre-made optical scale substrate comprises utilizing the installation tool in engagement with the outer area of the pre-made optical marker while maintaining separation between the installation tool and the central area of the pre-made optical marker.

* * * * *